United States Patent
Langewisch

(10) Patent No.: US 8,210,144 B2
(45) Date of Patent: Jul. 3, 2012

(54) VALVE BRIDGE HAVING A CENTRALLY POSITIONED HYDRAULIC LASH ADJUSTER

(75) Inventor: Edwin Henry Langewisch, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 669 days.

(21) Appl. No.: 12/153,599

(22) Filed: May 21, 2008

(65) Prior Publication Data

US 2009/0288626 A1  Nov. 26, 2009

(51) Int. Cl.
F01L 1/26 (2006.01)
(52) U.S. Cl. ..................... 123/90.22; 123/321
(58) Field of Classification Search ............. 123/90.46, 123/90.22, 320, 321, 90.45, 90.23, 90.33, 123/90.12, 90.15, 90.16
See application file for complete search history.

(56) References Cited

U.S. PATENT DOCUMENTS

| | | | | |
|---|---|---|---|---|
| 2,380,051 A * | 7/1945 | Kettering | .................. | 123/90.4 |
| 3,140,698 A * | 7/1964 | Voorhies | .................. | 123/90.46 |
| 3,809,033 A | 5/1974 | Cartledge | | |
| 4,572,114 A * | 2/1986 | Sickler | .................. | 123/21 |
| 4,677,723 A | 7/1987 | Greene, Sr. | | |
| 4,793,307 A * | 12/1988 | Quenneville et al. | ......... | 123/323 |
| 4,805,567 A * | 2/1989 | Heimburg | ............... | 123/90.22 |
| 4,924,821 A * | 5/1990 | Teerman | .................. | 123/90.22 |
| 5,535,710 A | 7/1996 | Zoschke et al. | | |
| 5,609,133 A | 3/1997 | Hakansson | | |
| 5,660,153 A | 8/1997 | Hampton et al. | | |
| 6,006,706 A * | 12/1999 | Kanzaki | .................. | 123/90.15 |
| 6,234,143 B1 * | 5/2001 | Bartel et al. | ............... | 123/321 |
| 6,293,248 B1 * | 9/2001 | Zsoldos et al. | ............. | 123/321 |
| 6,314,926 B1 | 11/2001 | Meneely et al. | | |
| 6,354,265 B1 * | 3/2002 | Hampton et al. | ............. | 123/321 |
| 6,422,186 B1 | 7/2002 | Vanderpoel | | |
| 6,644,271 B1 | 11/2003 | Cotton, III | | |
| 6,691,654 B2 | 2/2004 | Uehara et al. | | |
| 6,718,940 B2 | 4/2004 | Usko | | |
| 6,866,017 B2 | 3/2005 | Ruggiero et al. | | |
| 6,957,634 B2 | 10/2005 | Chang | | |
| 6,988,471 B2 | 1/2006 | Chang | | |
| RE39,258 E | 9/2006 | Cosma et al. | | |
| 7,114,230 B2 | 10/2006 | Batchelor et al. | | |
| 7,520,262 B2 * | 4/2009 | Jeong et al. | .................. | 123/321 |
| 7,644,693 B2 * | 1/2010 | Cecur | .................. | 123/90.52 |
| 7,673,600 B2 * | 3/2010 | Yang | .................. | 123/90.16 |
| 2005/0087159 A1 | 4/2005 | Harmon | | |
| 2005/0211206 A1 * | 9/2005 | Ruggiero et al. | ......... | 123/90.16 |
| 2007/0119397 A1 | 5/2007 | Diggs et al. | | |
| 2007/0144472 A1 * | 6/2007 | Yang | .................. | 123/90.16 |
| 2007/0199529 A1 | 8/2007 | Deane | | |
| 2009/0090324 A1 * | 4/2009 | Katsumata et al. | ....... | 123/90.57 |

FOREIGN PATENT DOCUMENTS

EP  1775432  4/2007
EP  1832772  9/2007

OTHER PUBLICATIONS

Afjeh et al., U.S. Appl. No. 10/653,354, filed Aug. 28, 2003.
Wiley et al., U.S. Appl. No. 11/806,375, filed May 31, 2007.
Wotherspoon et al., U.S. Appl. No. 11/987,326, filed Nov. 29, 2007.
Photographs of hydraulic lash adjusters on exhaust bridge of a two-cycle diesel engine, 3 pages, Electro-Motive Diesel, Date unknown.

* cited by examiner

Primary Examiner — Thomas Denion
Assistant Examiner — Daniel Bernstein
(74) Attorney, Agent, or Firm — Finnegan, Henderson, Farabow, Garrett & Dunner LLP

(57) ABSTRACT

A valve bridge configured to engage an engine valve is disclosed. The valve bridge includes a bridge cavity formed within a center portion of the valve bridge and including a bottom surface. A hydraulic lash adjuster is slidably disposed within the bridge cavity.

21 Claims, 3 Drawing Sheets

VALVE BRIDGE HAVING A CENTRALLY POSITIONED HYDRAULIC LASH ADJUSTER

TECHNICAL FIELD

The present disclosure is directed to a valve bridge and, more particularly, to a valve bridge having a centrally positioned hydraulic lash adjuster.

BACKGROUND

Compression braking, or engine braking, may be employed to assist and supplement wheel brakes in slowing heavy machines, such as, on-highway trucks, construction machines, earthmoving machines, and the like. Compression braking may convert an internal combustion engine from a power generating unit into a power consuming air compressor. A compression braking system may actuate a cylinder exhaust valve and compressed air from the compression stroke of the engine is released through the cylinder exhaust valve when the piston in the cylinder nears the top-dead-center position. Generally, the exhaust valve is actuated by a rocker arm. The rocker arm is often operatively engaged with the exhaust valve by way of a valve bridge. The rocking motion of the rocker arm presses down on the valve bridge which in turn opens the exhaust valve, releasing the compressed air.

A hydraulic lash adjuster is often disposed on the rocker arm and may be directly on or above the exhaust valve so as to maintain zero clearance between the exhaust valve and its corresponding valve seat. The hydraulic lash adjuster may include a hollow, sliding plunger operated by a hydraulic fluid, such as engine oil. When the exhaust valve is closed, the hydraulic lash adjuster may be free to fill with the hydraulic fluid. When the exhaust valve is opened, the fluid supply to the hydraulic lash adjuster may be blocked and fluid pressure within the hydraulic lash adjuster prevents the plunger from sliding.

At the end of a compression braking operation, a load associated with the rocking motion of the rocker arm is removed from the hydraulic lash adjuster. Because a load is absent from the plunger, the hydraulic lash adjuster may pump-up, wherein the plunger may excessively protrude from the hydraulic lash adjuster, resulting in the exhaust valve not fully seating. The partial opening of the exhaust valve may ultimately result in poor emissions and valve guttering.

One method of improving the performance of a compression braking system under such conditions is described in U.S. Pat. No. 6,718,940 B2 (the '940 patent) to Usko, issued on Apr. 13, 2004. The '940 patent describes a system for use in a diesel engine having a compression release retarder and is directed to an improved assembly for operating a valve in an engine cylinder. The assembly includes a rocker shaft, a rocker arm pivotally mounted on the rocker shaft for operating the valve, the rocker arm including a cavity at a valve actuation end, a hydraulic lash adjuster disposed within the rocker arm cavity for adjusting a lash between the rocker arm and the valve. The assembly further includes a fluid supply assembly for supplying fluid to the hydraulic lash adjuster to operate the hydraulic lash adjuster. The fluid supply assembly may include fluid passages in the rocker arm and a solenoid valve on the rocker shaft to supply hydraulic fluid to the hydraulic lash adjuster during a positive power mode of engine operation, and to cut off hydraulic fluid to the hydraulic lash adjuster during an engine braking mode.

The compression braking system of the present disclosure is directed towards improvements to the existing technology.

SUMMARY OF THE DISCLOSURE

One aspect of the present disclosure is directed to a valve bridge configured to engage an engine valve. The valve bridge may include a bridge cavity formed within a center portion of the valve bridge and including a bottom surface. A hydraulic lash adjuster may be slidably disposed within the bridge cavity.

Another aspect of the present disclosure is directed to a compression braking system configured to actuate an engine valve. The compression braking system may include a valve bridge configured to engage the engine valve and including a bridge cavity formed within a center portion of the valve bridge, the bridge cavity including a bottom surface. A hydraulic lash adjuster may be slidably disposed within the bridge cavity. The system may also include a rocker arm including a valve actuation side configured to engage the hydraulic lash adjuster and a passage configured to direct a fluid to the hydraulic lash adjuster. A driving output may be configured to actuate the rocker arm.

DETAILED DESCRIPTION

Figure 1:
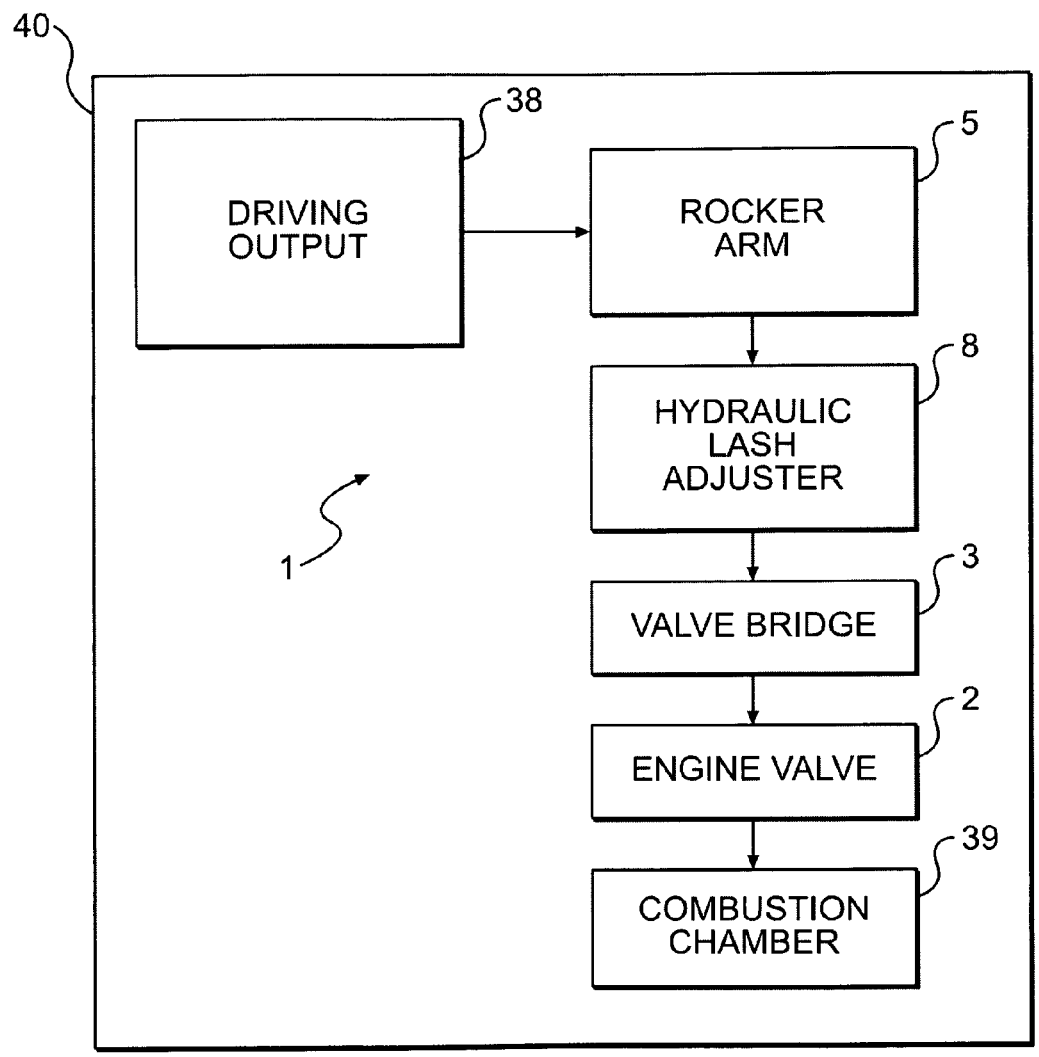
FIG. 1 is a diagrammatic illustration of an engine assembly according to an exemplary disclosed embodiment.

FIG. 1 diagrammatically illustrates an exemplary engine assembly 40. Engine assembly 40 may include at least one engine valve 2 and a compression braking system 1 configured to actuate engine valve 2. Actuation of engine valve 2 by compression braking system 1 may release compressed air from a compression stroke of a combustion cylinder 39 through engine valve 2 when a piston in combustion cylinder 39 nears a top-dead-center position.

Compression braking system 1 may include a valve bridge 3 configured to engage engine valve 2, a hydraulic lash adjuster 8 associated with valve bridge 3, a rocker arm 5 configured to engage hydraulic lash adjuster 8, and a driving output 38 configured to actuate rocker arm 5. Driving output 38 may include a variety of known mechanism capable of actuating rocker arm 5 for compression braking events, such as a hydraulically controlled slave piston, and any conventional type of driving output may be employed.

Figure 2:
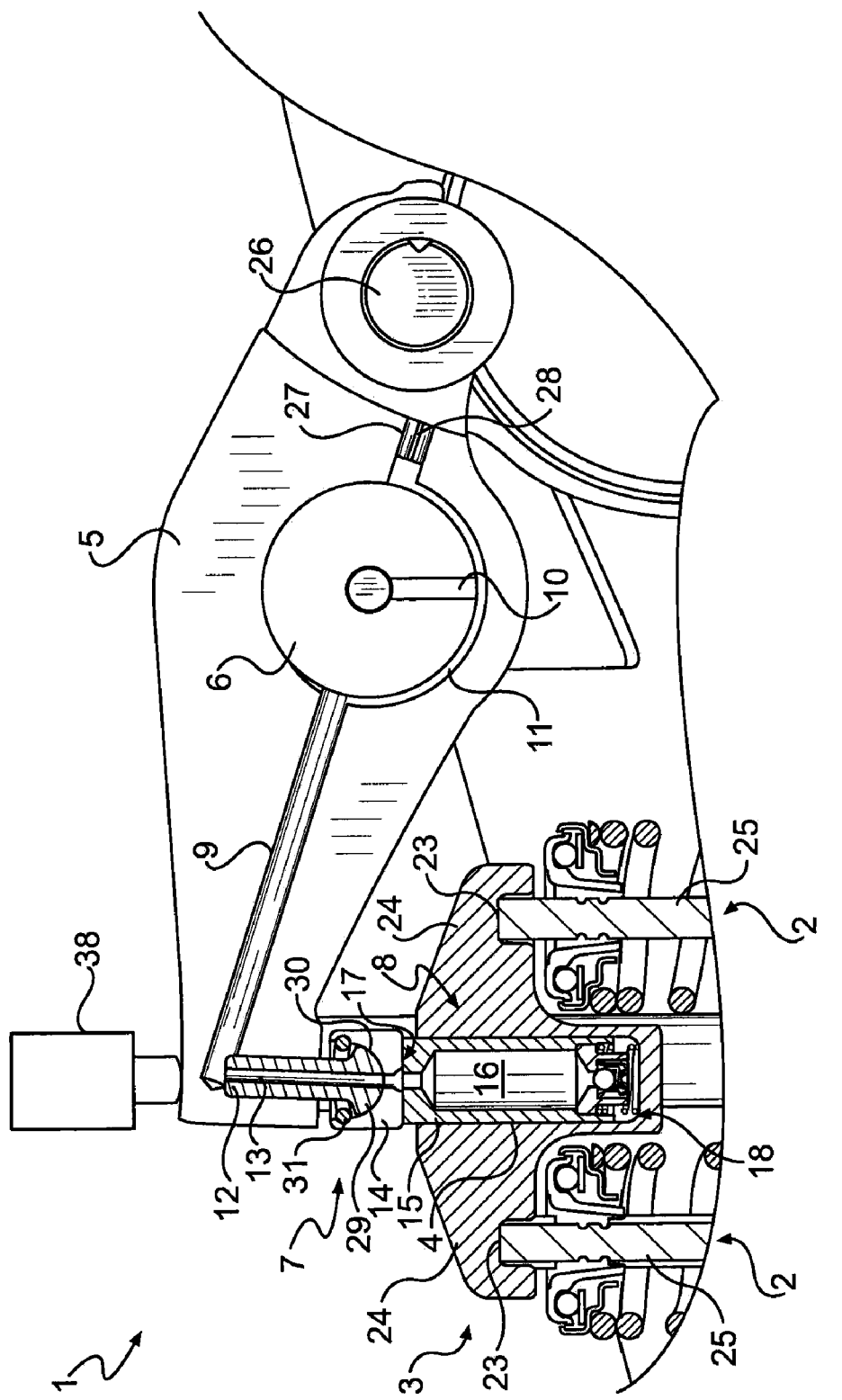
FIG. 2 is a schematic, cross-section of a portion of a compression braking system according to an exemplary disclosed embodiment.

FIG. 2 schematically illustrates a portion of compression braking system 1. Valve bridge 3 may be operatively connected to engine valve 2. Valve stems 25 of engine valve 2 may be engaged with bores 23 formed on lateral extensions 24 of valve bridge 3. Hydraulic lash adjuster 8 may be slidably disposed in a bridge cavity 4 of valve bridge 3. Rocker arm 5 may be pivotally mounted on a rocker shaft 6. Rocker arm 5 may include a valve actuation side 7 configured to engage hydraulic lash adjuster 8 and a passage 9 configured to direct a fluid, such as engine oil or any other hydraulic fluid, to hydraulic lash adjuster 8. Passage 9 may extend within rocker arm 5 from valve actuation side 7 to rocker shaft 6. Rocker shaft 6 may include supply groove 10 configured to direct hydraulic fluid to passage 9 of rocker arm 5 as rocker shaft 6 rotates. A bearing groove 11 may be disposed on rocker arm 5 and extend around the outer diameter of rocker shaft 6 to also direct hydraulic fluid as rocker shaft 6 rotates. Rocker arm 5 may also be pivotally mounted on a roller 26 on a terminal end of rocker arm 5 opposite valve actuation side 7. A cylindrical plug 27 having a conduit 28 may be disposed adjacent to rocker shaft 6 and may be configured to direct hydraulic fluid to roller 26 for lubrication.

A hollow member 12, such as a hollow insert, may be associated with valve actuation side 7 of rocker arm 5 and be configured to be in fluid communication with a plunger 15 of hydraulic lash adjuster 8. Hollow member 12 may include a channel 13 configured to feed the hydraulic fluid from passage 9 to a reservoir chamber 16 of hydraulic lash adjuster 8. A button member 14 may be associated with hollow member 12 and may be configured to engage a first end 17 of reservoir chamber 16. Channel 13 may extend through button member 14 and to reservoir chamber 16, wherein an end of channel 13 engaging plunger 15 may be flared to allow hydraulic fluid to contact a top portion of plunger 15 to lubricate and seal the connection between button member 14 and hydraulic lash adjuster 8, preventing excess leakage of hydraulic fluid. Hollow member 12 may also include a rounded, convex bottom 29 engaged with a concave, inner portion 30 of button member 14. Convex bottom 29 of hollow member 12 may be configured to pivot around concave, inner portion 30 of button member 14 as rocker arm 5 is actuated, minimizing stress on hollow member 12 and rocker arm 5. A retaining ring 31 may be disposed between button member 14 and hollow member 12 to maintain the engagement of button member 14 and hollow member 12.

Figure 3:
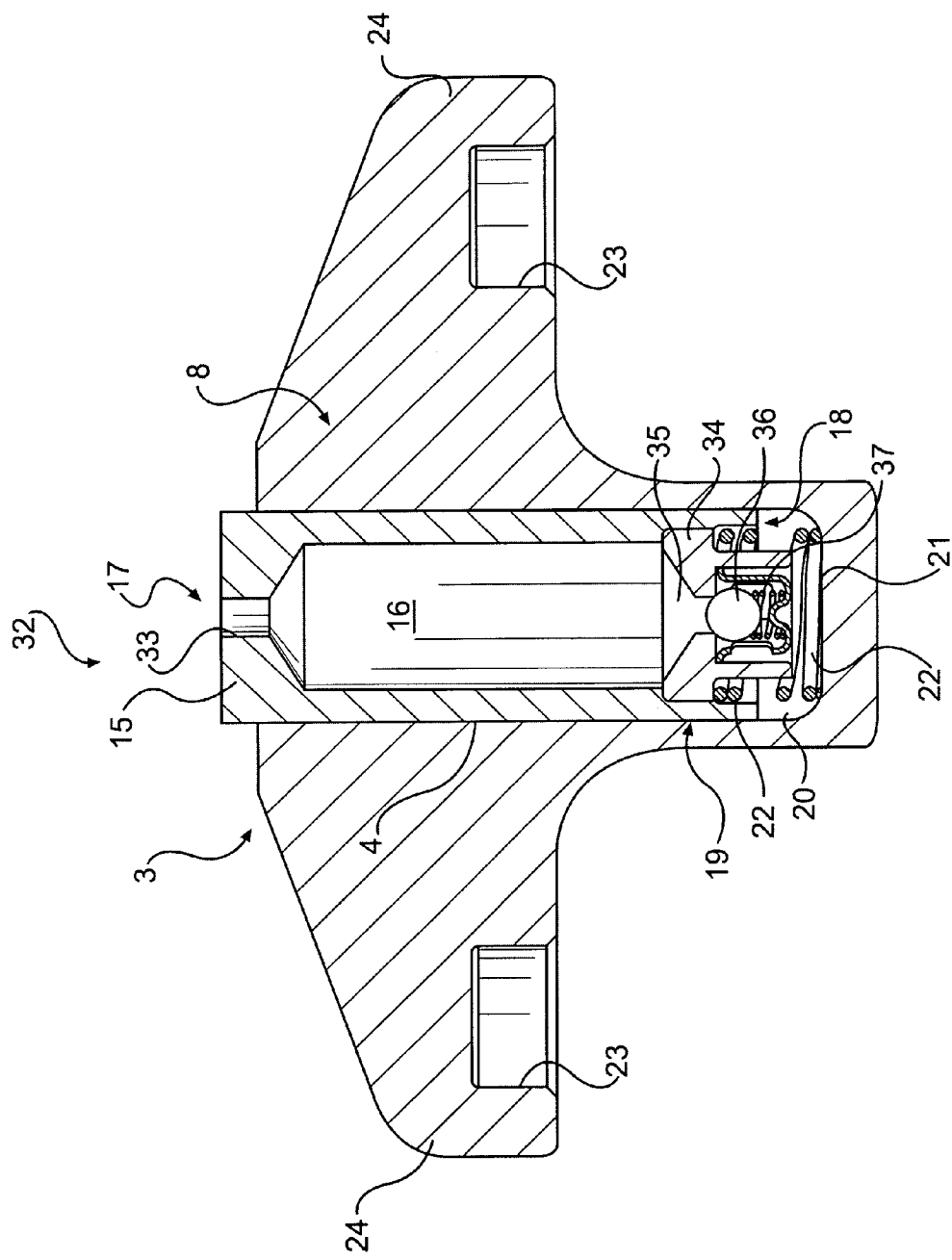
FIG. 3 is a schematic, cross-section view of an exemplary valve bridge for the exemplary disclosed compression braking system shown in FIG. 2.

As shown in FIG. 3, valve bridge 3 may have a T-shaped configuration wherein each lateral extension 24 includes bore 23 to engage valve stem 25. A bridge cavity 4 may be formed within a center portion 32 of valve bridge 3. Center portion 32 may be substantially centered on valve bridge 3 between lateral extensions 24. Hydraulic lash adjuster 8 may be slidably disposed within bridge cavity 4. Plunger 15 may be slidably assembled within bridge cavity 4 and may include reservoir chamber 16 having first end 17 and a second end 18 configured to receive and fill with hydraulic fluid. As discussed above and shown in FIG. 2, first end 17 may engage button member 14 and hydraulically connect rocker arm 5 and hydraulic lash adjuster 8. First end 17 may include an entrance 33 to receive hydraulic fluid, wherein entrance 33 flares open to a larger main chamber of reservoir chamber 16. A check valve 19 may be proximate second end 18 of reservoir chamber 16 and may direct the flow of hydraulic fluid into a hydraulic chamber 20 disposed between check valve 19 and a bottom surface 21 of bridge cavity 4. Check valve 19 may selectively direct hydraulic fluid into hydraulic chamber 20 as pressure in reservoir chamber 16 becomes greater than pressure within hydraulic chamber 20. As pressure within hydraulic chamber 20 becomes greater than pressure within reservoir chamber 16, check valve 19 may cut-off the flow of hydraulic fluid into hydraulic chamber 20. For example, in the exemplary embodiment of FIG. 3, check valve 19 may be a ball check valve including a valve housing 34 with a tapered passageway 35 and a spherical ball 36 positioned to close passageway 35 due to a load exerted on ball 36 by valve spring 37. Hydraulic fluid may be directed into hydraulic chamber 20 as fluidic pressure within reservoir chamber 16 exceeds the fluidic pressure of hydraulic chamber 20 exerted on ball 36. Once the fluidic pressure exerted on ball 36 exceeds the fluidic pressure in reservoir chamber 16, the hydraulic fluid flow into hydraulic chamber 20 is blocked by ball 36. It should be appreciated that a variety of known types of check valves may be capable of selectively directing hydraulic fluid into hydraulic chamber 20 and that any conventional check valve may be employed.

A spring 22 may be disposed between second end 18 of reservoir chamber 16 and bottom surface 21 of bridge cavity 4 and may be configured to bias plunger 15 upward, repositioning plunger 15 after a downward force from rocker arm 5 is removed from hydraulic lash adjuster 8. Bottom surface 21 may have a rounded surface so as to account for any high stress exerted by spring 22.

INDUSTRIAL APPLICABILITY

The disclosed compression braking system 1 may have applicability with internal combustion engines for compression braking operation. For example, and as shown in FIG. 1, compression braking system 1 may serve to actuate at least one engine valve 2, releasing compressed air from a compression stroke of an engine assembly 40. By releasing compressed air via engine valve 2, energy from the compressed air may be prevented from returning to and driving the engine assembly 40.

During operation of compression braking system 1, rocker shaft 6 may rotate and transfer hydraulic fluid from supply groove 10 to bearing groove 11 and passage 9 of rocker arm 5. Hydraulic fluid may be supplied through passage 9 and to a valve actuation side 7 of rocker arm 5. Hollow member 12, may be disposed on valve actuation side 7 and may be configured to receive hydraulic fluid from passage 9. Hydraulic fluid may flow through channel 13 of hollow member 12 and feed into hydraulic lash adjuster 8 mounted within bridge cavity 4 of valve bridge 3. Fluid communication between hollow member 12 of rocker arm 5 and hydraulic lash adjuster 8 of valve bridge 3 may be facilitated by a button member 14. Button member 14 may be configured to engage and seal hollow member 12 to hydraulic lash adjuster 8, providing lubrication and preventing excess leakage of hydraulic fluid.

As shown in FIG. 2, hydraulic fluid may be supplied to reservoir chamber 16 of plunger 15. As reservoir chamber 16 fills, hydraulic fluid entering reservoir chamber 16 may open check valve 19 allowing hydraulic fluid to flow into a hydraulic chamber 20 disposed between check valve 19 and a bottom surface 21 of bridge cavity 4. As reservoir chamber 16 and hydraulic chamber 20 fill with hydraulic fluid, plunger 15 may move upward, further assisted by a spring 22 disposed on a second end 18 of reservoir chamber 16 and configured to bias plunger 15 upward.

When driving output 38 is activated, energy may be transmitted to rocker arm 5 and converted to a rocking motion of rocker arm 5. As energy is supplied to rocker arm 5, rocker arm 5 may pivot around rocker shaft 6 and transmit a downward force onto hydraulic lash adjuster 8. The downward force onto hydraulic lash adjuster 8 may transfer a load onto plunger 15 and subsequently onto hydraulic chamber 20. The pressure within hydraulic chamber 20 may become substantially greater than the pressure of hydraulic fluid supplied to check valve 19; therefore, check valve 19 may cut-off the supply of hydraulic fluid into hydraulic chamber 20. The hydraulic fluid within hydraulic chamber 20 may be incompressible, thereby, transferring the downward force and load from plunger 15 to bottom surface 21 of bridge cavity 4. This may result in the downward motion of valve bridge 3, the downward motion of valve stems 25 engaged with valve bridge 3, and ultimately the unseating and opening of engine valve 2.

Disposing hydraulic lash adjuster 8 within bridge cavity 4 of valve bridge 3 may allow for quick and easy service of a damaged or malfunctioning hydraulic lash adjuster 8. Components of hydraulic lash adjuster 8, such as, plunger 15 and check valve 19, may be easily removed from bridge cavity 4 and may not require the entire valve bridge 3 to be dismantled and disassembled. Therefore, inefficiencies and costly downtime resulting from hydraulic lash adjuster 8 repair may be avoided. In addition, because hydraulic lash adjuster 8 may be integrated with valve bridge 3 and directly in the load path of rocker arm 5, pump-up of hydraulic lash adjuster 8 may be avoided.

It will be apparent to those skilled in the art that various modifications and variations can be made to the compression braking system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A valve bridge comprising:
   a bridge cavity formed within a center portion of the valve bridge, the bridge cavity including a closed bore extending into the center portion of the valve bridge, the closed bore including a continuous fixed bottom surface that fully seals a bottom portion of the bridge cavity;
   a hydraulic lash adjuster slidably disposed within the bridge cavity, and wherein the valve bridge is configured to engage at least two engine valves.

2. The valve bridge of claim 1, wherein the hydraulic lash adjuster includes a plunger slidably disposed within the bridge cavity.

3. The valve bridge of claim 2, wherein the plunger includes a reservoir chamber configured to receive a fluid, the reservoir chamber including a first end and a second end.

4. The valve bridge of claim 3, further including a check valve proximate the second end of the reservoir chamber.

5. The valve bridge of claim 3, further including a spring proximate the second end of the reservoir chamber and configured to bias the plunger and the bottom surface of the bridge cavity.

6. The valve bridge of claim 4, further including a hydraulic chamber disposed between the check valve and the bottom surface of the bridge cavity and configured to receive the fluid through the check valve.

7. A compression braking system configured to actuate at least two engine valves, comprising:
   a valve bridge configured to engage the at least two engine valves and including a bridge cavity formed within a center portion of the valve bridge, the bridge cavity including a bottom surface;
   a hydraulic lash adjuster slidably disposed within the bridge cavity;
   a rocker arm including a valve actuation side configured to engage the hydraulic lash adjuster and a passage configured to direct a fluid to the hydraulic lash adjuster;
   a driving output configured to actuate the rocker arm; and
   wherein the compression braking system is configured such that fluid is substantially sealed within the bridge cavity whenever that the rocker arm is moving the hydraulic lash adjuster and the valve bridge.

8. The compression braking system of claim 7, wherein the hydraulic lash adjuster includes a plunger slidably disposed within the bridge cavity.

9. The compression braking system of claim 8, wherein the plunger includes a reservoir chamber configured to receive the fluid, the reservoir chamber including a first end and a second end.

10. The compression braking system of claim 9, further including a check valve proximate the second end of the reservoir chamber.

11. The compression braking system of claim 9, further including a spring proximate the second end of the reservoir chamber and configured to bias the plunger and the bottom surface of the bridge cavity.

12. The compression braking system of claim 10, further including a hydraulic chamber disposed between the check valve and the bottom surface of the bridge cavity and configured to receive the fluid through the check valve.

13. The compression braking system of claim 9, further including a hollow member associated with the valve actuation side of the rocker arm, the hollow member configured to be in fluid communication with the plunger.

14. The compression braking system of claim 13, wherein the hollow member includes a channel configured to direct the fluid from the passage of the rocker arm to the reservoir chamber.

15. The compression braking system of claim 13, further including a button member associated with the hollow member and configured to engage the first end of the reservoir chamber.

16. An engine assembly including at least two engine valves, the engine assembly comprising:
   a compression braking system configured to actuate the at least two engine valves including:
      a valve bridge having at least two fixed recesses that engage stems of the at least two engine valves in a manner preventing substantial sliding of the valves relative to the valve bridge whenever the compression braking system is operating to actuate the at least two valves, and wherein the valve bridge includes a bridge cavity formed within a center portion of the valve bridge, the bridge cavity including a closed bore extending into the center portion of the valve bridge, the closed bore including a continuous fixed bottom surface that fully seals a bottom portion of the bridge cavity;
      a hydraulic lash adjuster slidably disposed within the bridge cavity; a rocker arm including a valve actuation side configured to engage the hydraulic lash adjuster and a passage configured to direct a fluid to the hydraulic lash adjuster; and
      a driving output configured to actuate the rocker arm.

17. The engine assembly of claim 16, wherein the hydraulic lash adjuster includes a plunger slidably disposed within the bridge cavity, the plunger including a reservoir chamber configured to receive the fluid.

18. The engine assembly of claim 17, further including a check valve proximate a second end of the reservoir chamber and a hydraulic chamber disposed between the check valve and the bottom surface of the bridge cavity, the hydraulic chamber configured to receive the fluid through the check valve.

19. The engine assembly of claim 18, further including a hollow member associated with the valve actuation side of the rocker arm, the hollow member including a channel configured to be in fluid communication with the reservoir chamber of the plunger.

20. The engine assembly of claim 19, further including a button member associated with the hollow member and configured to engage the first end of the reservoir chamber.

21. An engine assembly including at least two engine valves, the engine assembly comprising:

a compression braking system configured to actuate the at least two engine valves including:

a valve bridge configured to engage the at least two engine valves and including a bridge cavity formed within a center portion of the valve bridge, the bridge cavity including a bottom surface;

a hydraulic lash adjuster slidably disposed within the bridge cavity;

a rocker arm including a valve actuation side configured to engage the hydraulic lash adjuster and a passage configured to direct a fluid to the hydraulic lash adjuster; and a driving output configured to actuate the rocker arm, the driving output including a hydraulically actuated slave piston that is separate from the hydraulic lash adjuster and configured to actuate the rocker arm to drive the lash adjuster, the valve bridge, and the at least two engine valves to provide compression braking.

* * * * *